United States Patent [19]

Day

[11] Patent Number: 4,851,987
[45] Date of Patent: Jul. 25, 1989

[54] SYSTEM FOR REDUCING PROCESSOR POWER CONSUMPTION BY STOPPING PROCESSOR CLOCK SUPPLY IF A DESIRED EVENT DOES NOT OCCUR

[75] Inventor: Michael N. Day, Austin, Tex.

[73] Assignee: International Business Machines Corporation, Armonk, N.Y.

[21] Appl. No.: 820,460

[22] Filed: Jan. 17, 1986

[51] Int. Cl.⁴ .............................................. G06F 1/04
[52] U.S. Cl. .................................. 364/200; 365/227; 364/707; 364/270; 364/270.6; 364/273.1; 364/271.6
[58] Field of Search ...................... 364/200, 900, 707; 365/227, 229

[56] References Cited

U.S. PATENT DOCUMENTS

| | | | |
|---|---|---|---|
| 3,411,147 | 11/1968 | Packard | 364/200 |
| 3,941,989 | 3/1976 | McLaughlin et al. | 235/156 |
| 4,203,153 | 5/1980 | Boyd et al. | 364/200 |
| 4,279,020 | 7/1981 | Christian et al. | 364/900 |
| 4,293,927 | 10/1981 | Hoshii | 364/900 |
| 4,316,247 | 2/1982 | Iwamoto | 365/227 |
| 4,317,180 | 2/1982 | Lies | 364/900 |
| 4,409,665 | 10/1983 | Tubbs | 364/707 |
| 4,419,917 | 12/1983 | Sato | 84/1.01 |
| 4,435,761 | 3/1986 | Kimoto | 364/200 |
| 4,455,623 | 6/1984 | Haas et al. | 364/900 |
| 4,479,191 | 10/1983 | Nojima et al. | 364/707 |
| 4,545,030 | 10/1985 | Kitchin | 364/900 |
| 4,573,117 | 2/1986 | Boney | 364/200 |
| 4,586,179 | 4/1986 | Sirati et al. | 371/66 |
| 4,615,005 | 9/1986 | Maejima et al. | 364/707 |
| 4,627,085 | 12/1986 | Yuen | 364/900 |
| 4,641,044 | 2/1987 | Shiraishi | 307/269 |
| 4,665,328 | 5/1987 | Hall | 365/227 |
| 4,698,748 | 10/1987 | Juswik | 364/200 |
| 4,757,505 | 7/1988 | Marrington | 364/200 |
| 4,758,945 | 7/1988 | Remedi | 364/200 |
| 4,780,843 | 10/1988 | Tiejen | 364/707 |

OTHER PUBLICATIONS

Foster, L. D., "Battery Powered Data Entry Unit", IBM Technical Disclosure Bulletin, vol. 15, No. 11 (Apr. 1973), pp. 3437-3438.

Primary Examiner—Archie E. Williams, Jr.
Assistant Examiner—Eric Coleman
Attorney, Agent, or Firm—Joseph F. Villella, Jr.; H. St. Julian

[57] ABSTRACT

An apparatus and method are provided for disabling the clocking of a processor in a battery operated computer during non-processing times. The clocking is disabled at the conclusion of a processing operation. The clocking can then be re-enabled using interrupts from any one of a plurality of sources, such as an I/O device or a direct memory access. Application programs and operating system programs running on the system can specify the stopping of the system clock and the central processor until a specified event which had been requested occurs, or until an optional time-out period has expired. In this situation, the event is defined as one that results in either a system interrupt from an I/O device or from a direct memory access operation. The stopping of the system clock is a two part operation wherein in the first part the stopping mechanism is first armed. If an interrupt is received subsequent to arming, then it will be processed and the arming mechanism will be reset. However, if an interrupt does not occur after arming within a specified time period, then the system clock will be stopped.

10 Claims, 8 Drawing Sheets

SYSTEM FOR REDUCING PROCESSOR POWER CONSUMPTION BY STOPPING PROCESSOR CLOCK SUPPLY IF A DESIRED EVENT DOES NOT OCCUR

TECHNICAL FIELD

This invention relates to an apparatus and method for controlling a system clock in a computer, and more particularly for controlling a system clock in a battery operated computer to reduce power consumption.

BACKGROUND ART

In the data processing environment, a large percentage of a central processor's time is spent in idle loops waiting for one or more I/O devices to complete an operation or for further input to the processor from an operator. In a system where AC power is being used to provide power to the central processor, the time spent in idle loops is not very critical. However, in an operating environment wherein power is being supplied to the central processor from a battery, time spent in idle loops by the central processor needlessly wastes battery power. Consequently, it would be desirable to prevent a central processor from performing idle loops while waiting for the completion of an operation by an I/O device or when waiting for further input to the processor from an operator. As small computers, especially those which are portable, become more prevalent, the need to conserve battery power becomes increasingly important.

Typically, a battery operated computer uses complementary metal-oxide-silicon (CMOS) circuits to reduce power consumption. However, in order to take full advantage of these CMOS circuits, the circuits must not be clocked when their usage is not required. As is well known, the characteristics of CMOS circuits provide very low standby power consumption when they are not being clocked. In order to fully realize this power saving advantage, application programs and the operating system software that are running on the data processing system must be able to stop the system clocks when the central processor is waiting for the completion of an I/O operation or for further operator input.

U.S. Pat. No. 3,941,989 discloses one method for reducing power consumption in calculators wherein lower duty cycle power and lower duty cycle clock pulses are supplied during the calculator display mode. While the calculator is in an execute mode, continuous power and a high rate clock are supplied. If an execute mode is not initiated within a selected time interval, the duty cycle of both the power and the clock are lowered even further than that provided during the display mode.

U.S. Pat. No. 4,435,761 disclose a data processing apparatus having both a data transmitting and receiving unit for transferring data, and a processing unit for processing the data. Means are provided for stopping the supply of a control clock signal while the transmission of data is in progress.

Another approach to conserving energy in data processing systems is shown in both U.S. Pat. Nos. 4,279,020 and 4,455,623. In the former, when the central processor completes operation, it provides an output signal to a power-down sub-circuit of a power supply which then removes power from the central processor. In this manner, power is not supplied to the processor when it is not operating. In the latter, the current consumption of a microprocessor is decreased by a switch which connects it to a power supply only when a control signal is received which indicates that the microprocessor is to execute a program. Specifically, an electronic switch is used to switch to a non-conductive state unless a control signal is received. For software programs which require a greater time for execution than the duration of the control signal, the microprocessor supplies a signal to the electronic switch thereby keeping it in the conductive state until the software program has been fully executed. A similar approach is shown in U.S. Pat. No. 4,203,153.

U.S. Pat. No. 4,409,665 discloses the conservation of power in a calculator having a memory utilizing CMOS circuits. Incorporation of two switched voltages and a single non-switched voltage enables power to be switched off to the calculator's logic, display interface and keystroke detect circuitry, while power is maintained to the memory. In other embodiments, multiple modes such as off mode, display only mode, process only mode, and a display and process mode are used to optimize power dissipation. The calculator powers up into the display mode until a keystroke is detected. At that time, power is supplied to the processor until completion of the processing. This power conservation is effected using a first power switching means connected to a first circuit group and to a power consumption controller, and a second power switching means connected to the power consumption controller and to a second circuit group.

SUMMARY OF THE INVENTION

It is an object of this invention to provide an apparatus and method for stopping a system clock in a general purpose computer.

It is another object of this invention to provide an apparatus and method for conserving power in a battery operated computer by suspending clocking of a central processor during idle times.

It is yet another object of this invention to provide an apparatus and method to turn off a central processor during idle times and to turn the processor back on upon the receipt of input from an I/O device.

In accordance with these and other objects of the invention, an apparatus and method are provided for disabling the clocking of a central processor in a battery operated computer during non-processing times. Means are provided for disabling the clocking at the conclusion of a processing operation and for enabling the clocking of the processor using interrupts from any one of a plurality of sources. These interrupts include direct memory access (DMA) interrupts, as well as I/O interrupts which occur when an I/O device needs services. The I/O interrupts invoke short routines located in either ROM or in a main application program that are used to service an I/O device. The I/O devices include a display, printer, diskette drives, a keyboard, and communication devices such as a modem and a RS232 communication interface, and a system timer.

A function is provided which provides application programs and operating system programs running on the computer system with a method to specify the stopping of system clocks and the central processor until a specified event which had been requested occurs or until an optional time-out period has expired. In this situation, the event is defined as one that results in either a system interrupt from one of the plurality of I/O devices or from a DMA operation.

In operation, hardware which is used to stop the system clocks is first armed. This arming does not in itself stop the clocks but rather enables them to be stopped at a later time. If an interrupt is then received, it will be processed and the arming mechanism will be reset. However, If an interrupt does not occur after arming, within a specified time period, then the system clock will be stopped. The system clock will then be restarted upon the receipt of an interrupt—either in the form of a direct memory access or from an I/O device.

DESCRIPTION OF THE PREFERRED EMBODIMENT

Figure 1:
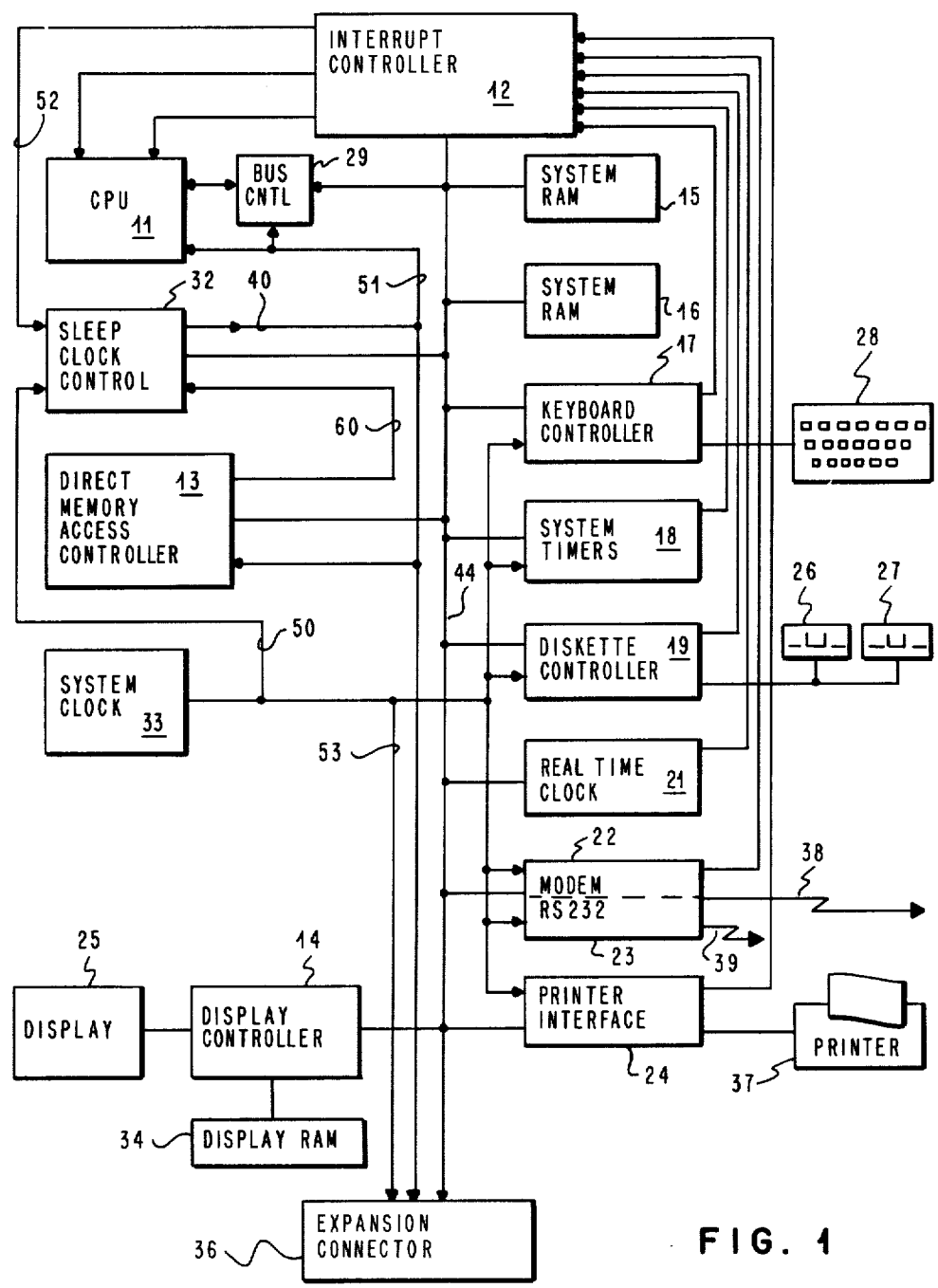
FIG. 1 is a functional block diagram of the system according to the present invention.

The overall system of the invention is shown in FIG. 1. System bus 44 provides data communication among interrupt controller 12, CPU 11 through bus control 29, sleep clock control 32, direct memory access controller 13, system RAM 15, system ROM 16, keyboard controller 17, system timer 18, diskette controller 19, real time clock 21, modem 22 and RS232 communication interface 23, display controller 14, printer interface 24, and expansion connector 36. Note that there is data communication between keyboard controller 17 and keyboard 28, between diskette controller 19 and diskette drives 26 and 27, between printer interface 24 and printer 37, as well as between display controller 14 and display 25 and display RAM 34. Expansion connector 36 provides communication with other I/O devices not shown in FIG. 1. Direct memory access (DMA) controller contains both clocked and unclocked sections, i.e., some sections of controller 13 require continuous clocking while others do not.

Sleep clock control 32 is essentially a switch mechanism. System clock 33 provides a clock input over line 50 to sleep clock control 32. During a normal clocking operation, sleep clock control 32 passes this clocking signal over output 40 to bus 51. As can be seen, the clocking signal is provided to CPU 11 as well as to the remainder of the devices on bus 51. During non-clocking time periods, no clocking signal is provided from output 40 of sleep clock control 32. Note that a clocking signal is provided at all times over bus 53 to keyboard controller 17, system timer 18, diskette controller 19, modem 22, RS232 communication interface 23, printer interface 24, display controller 14, and expansion connector 36. These devices are continually clocked by system clock 33. It is only CPU 11, system RAM 15, DMA controller 13, and bus controller 29 to which the clock signal from system clock 33 is turned on and off, thereby saving power.

Interrupt controller 12 receives interrupts from printer interface 24, modem 22, and RS232 communication interface 23, real time clock 21, diskette controller 19, system timer 18, and keyboard controller 17. An interrupt request is sent from interrupt controller 12 over line 52 to sleep clock control 32. When this occurs, sleep clock control 32 provides over output 40 a clocking signal out over bus 51. Interrupt controller 12 also provides an interrupt signal as well as a non-maskable interrupt (NMI) signal to CPU 11. Finally, whenever a direct memory access request is received by DMA controller 13, it outputs over line 60 a DMA request to sleep clock control 32. Sleep clock control 32 then provides a clocking signal over output 40 onto bus 51. This occurs whenever an I/O device requires direct memory access.

Sleep clock control 32 continues to supply the clock over bus 51 until the "Wait for External Event" code executing in CPU 11 from ROM 16 issues an ARM and STOP CLOCK I/O instruction. These instructions cause data to travel over bus 44 to sleep clock control 32. Sleep clock control then stops clock output 40, causing the clock signal on bus 51 to stop. This suspends execution of CPU 11 and other associated components. If an interrupt or DMA request is received after the ARM instruction has been issued but before or during the issuance of the STOP CLOCKS instruction, the sleep clock control 32 will not honor the STOP CLOCKS instruction and the clock on bus 52 will continue to run causing the CPU 11 to continue execution after the STOP CLOCKS instruction.

Figure 2:
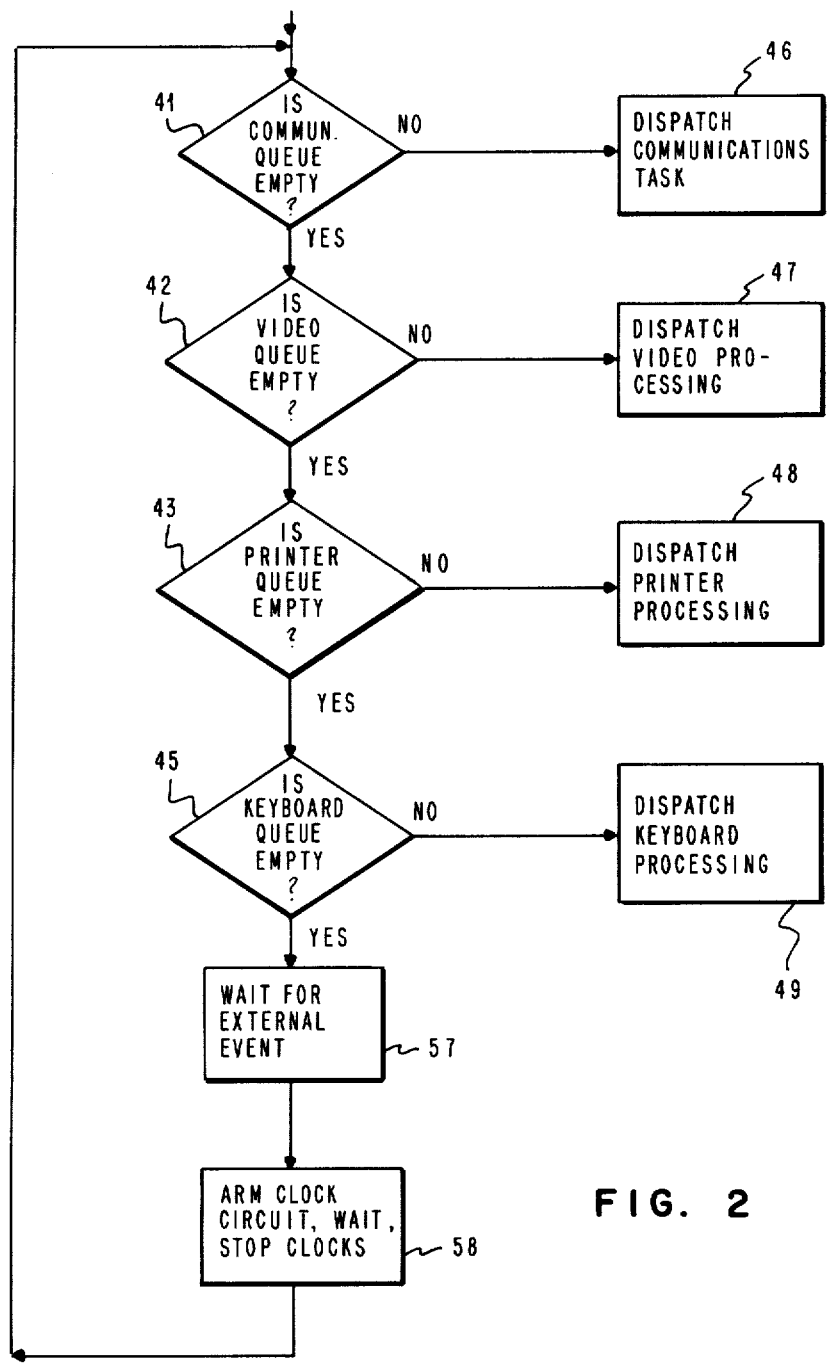
FIG. 2 is a flow chart of the overall operation of the system according to the present invention.

The general operation of the system of the present invention may be explained with reference to FIG. 2. At a time when CPU 11 is executing an application program or an I/O task, it waits for a task to be performed by one of the I/O devices. The dispatching of such a task by the operating system running on CPU 11 is included as an example and does not form a part of the present invention and will not be discussed further hereinafter. CPU 11 goes through a series of determinations. In decision block 41, a determination is made as to whether or not the communication queue is empty, i.e., whether modem 22 or RS232 communication interface 23 require an operation to be performed. If either do require such an operation, i.e., the communication queue is not empty, then as shown in block 46, CPU 11 dispatches using its operating system the communication task which is to be performed. However, if the communication queue is empty, then a second determination is made. In this case, as shown in decision block 42, a determination is made as to whether or not the video queue is empty. Once again, if it's not, then CPU 11 dispatches a video processing task as shown in step 47. However, if the video queue is empty, then a determination is made as to whether or not the printer queue is empty. If it is not, then as shown in step 48, a printer processing test is dispatched from CPU 11. Upon the printer queue being empty, the queue of keyboard controller 17 is next checked as shown in step 45. Once again, if the queue is not empty, then CPU 11 dispatches a keyboard processing task as shown in step 49. Finally, if all of the queues which are to be checked are empty, signifying that CPU 11 need not dispatch any tasks to the I/O devices, then CPU 11 goes into a mode where it waits for an external event. The "Wait for External Event" routine is then entered. It will ARM sleep clock control 32 by issuing ARM and STOP I/O commands over bus 44 which causes sleep clock control 32 to stop providing a clock on bus 51, thus suspending processing of CPU 11 after the I/O instruction. CPU 11 will stay unclocked until an interrupt or DMA request is received by sleep control 32, at which point clocks are again provided on bus 51. This will cause CPU 11 to resume instruction processing of the event determination routine. Since a wait for any event was requested in this case, control is returned to the top of the dispatched as shown in FIG. 2.

Figure 3:
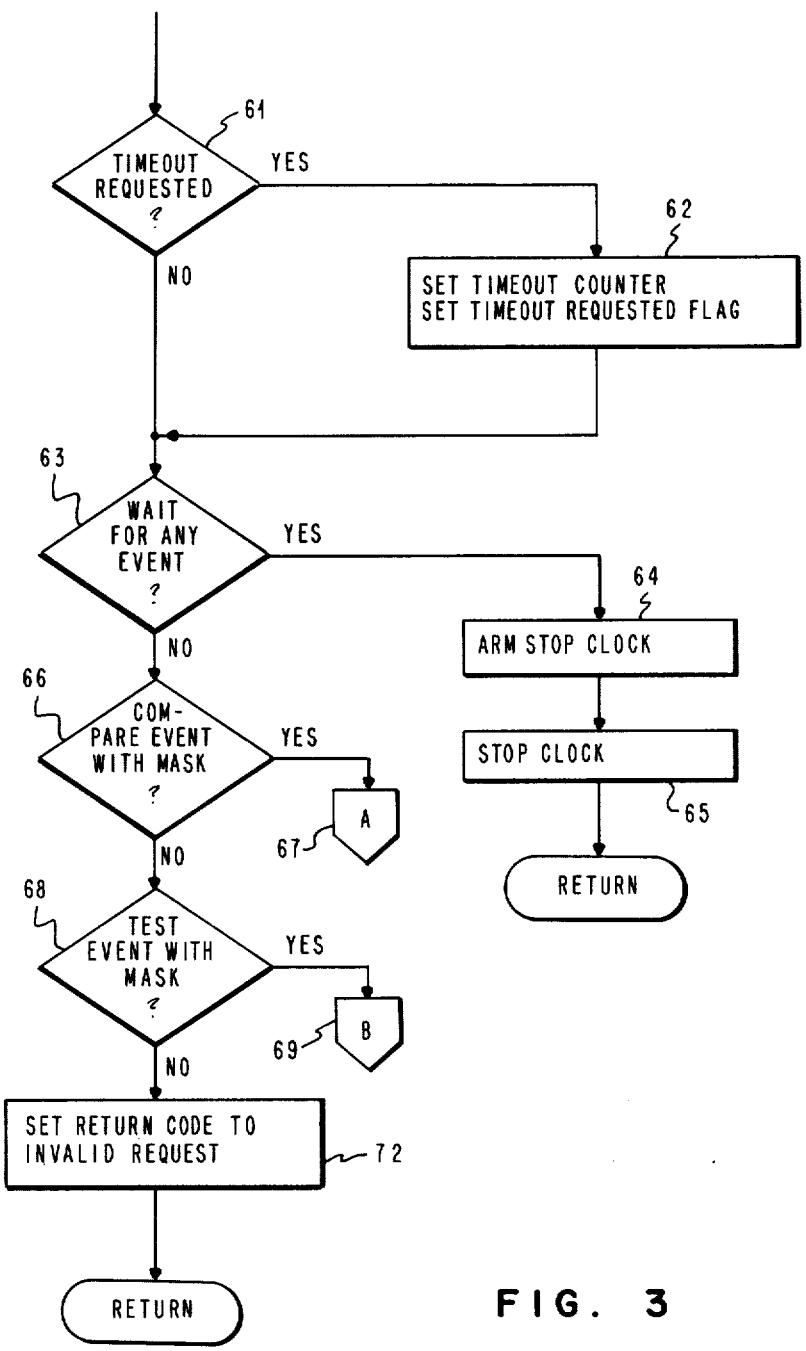
FIG. 3 is a flow chart of a function depicting operation of the system as it waits for a specified event.

The flow chart of FIG. 3 explains the operation of the system as it awaits an external event or until an optional time-out period has expired. In the system of the present invention, such an external event is defined as one that results in either a system interrupt or in a DMA operation, either of which causes a clocking signal to be restarted to those non-continuously clocked devices in the system. The computer code used to carry out the operation of FIG. 3 is contained in system ROM 16. The particular code may be called by another program residing in ROM 16 or may be called by an application running in RAM 15.

A wait for specific event flow is shown in FIG. 3. As indicated in decision block 61, a determination is first made as to whether or not a time-out function has been requested. A time-out function is used only by certain ones of the I/O devices in the system. For example, diskette controller 19 requires a time-out because if either one of diskette drives 26 or 27 were to malfunction during a read or write operation, then CPU 11 could wait indefinitely for an event that will not occur due to an error. If a time-out function is used, then if a read or write operation is not completed within the allotted time-out period, then the CPU 11 clock is restarted by timer 18 and the code in ROM indicates a time-out error to the application program or operating system, thereby allowing corrective action to be taken. Consequently, if a time-out has been requested, then as shown in step 62, a time-out counter is set in RAM 15 and a time-out requested flag is set to be active. If no time-out has been requested or the time-out counter and flag have been set, then a determination is made as to whether or not the system is waiting for any event to occur, or if a specific event is being waited for. If any event is being waited for by the system, then as shown in block 64, the sleep clock control 32 is armed and in block 65 sleep clock control 32 stops the system clocks. The CPU execution will be suspended in block 65 until an external event, interrupt or DMA request occurs. At that time, CPU 11 instruction execution is resumed and control passed back to the program requesting the wait for external event.

However, if a specific event within the system is being awaited, then two additional determinations must first be made. In decision block 66, a determination is made as to whether or not the specific event being waited for will be compared with a pre-existing mask. This determination is used to compare the predetermined mask on a byte basis with the event being waited for. In other words, a predetermined byte of data describing the occurrence of a specific event, or specific events, is compared on a byte basis with the events which occur in the system. If this is the case, then as shown in step 67, the flow chart will continue to FIG. 4 which will be explained in more detail hereinafter.

However, if the answer to decision block 66 is no, then a determination is made in decision block 68 as to whether or not the predetermined event which is being awaited will be compared on a bit by bit basis with any occurring event in the system. If the answer to decision block 68 is yes, then as shown in step 69, the logic will continue to the flow chart shown in FIG. 5. However, if the answer to decision block 68 is no, then an invalid request has been received by CPU 11 and an error is returned to the application program or operating system requesting the wait. Summarizing, decision block 66 determines whether or not any occurring events are to be compared on a byte basis with the predetermined event which is being waited for. Decision block 68 makes a determination as to whether or not the occurring event will be compared on a bit by bit basis with the predetermined event upon which the system is waiting. The compare byte approach is useful when one specific event is being waited for, and the compare bits approach is useful when a select set of events is being waited for.

Figure 4:
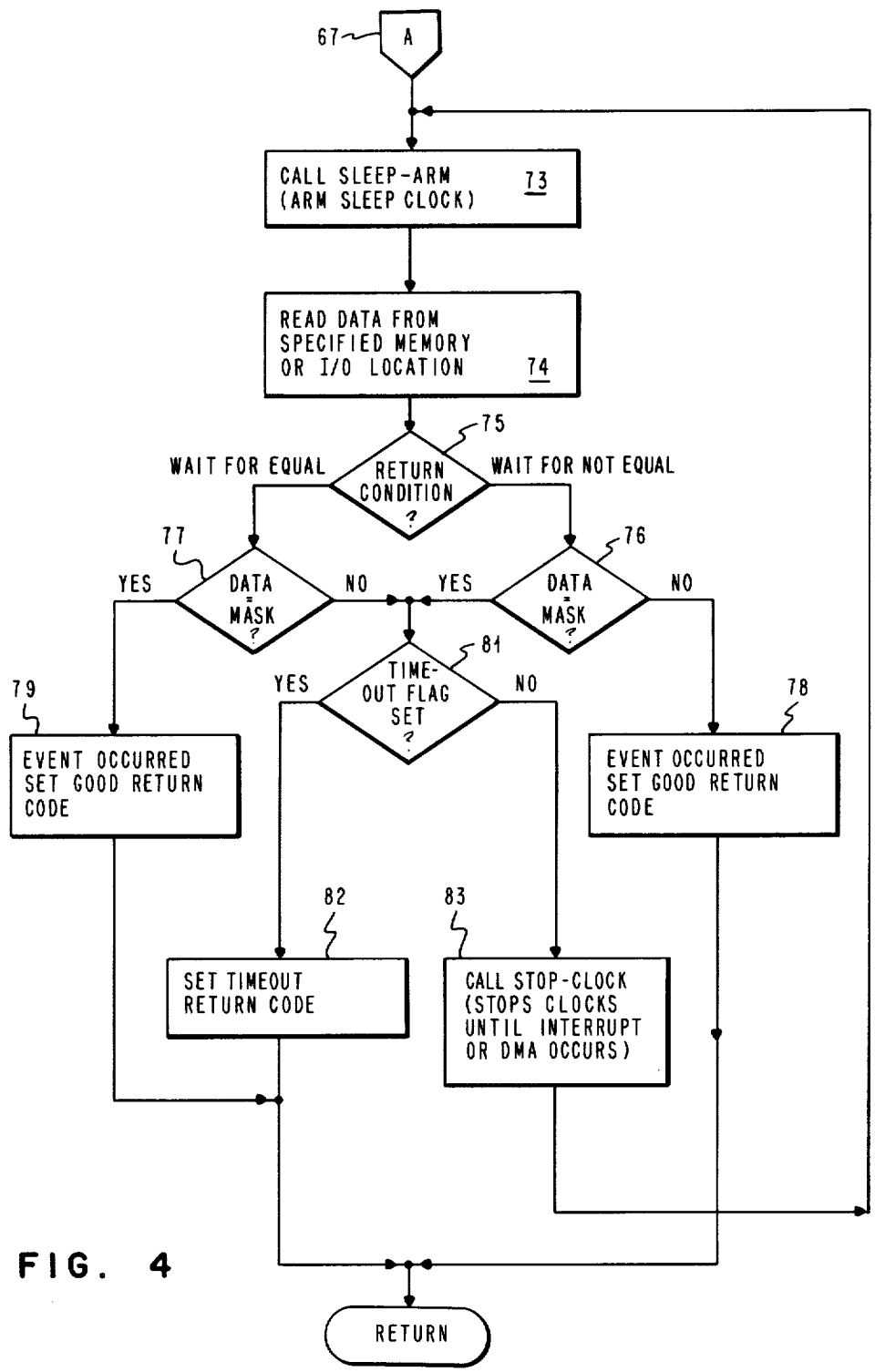
FIG. 4 is a flow chart for comparing the bytes comprising a received event to the bytes of a predetermined event.
Figure 6:
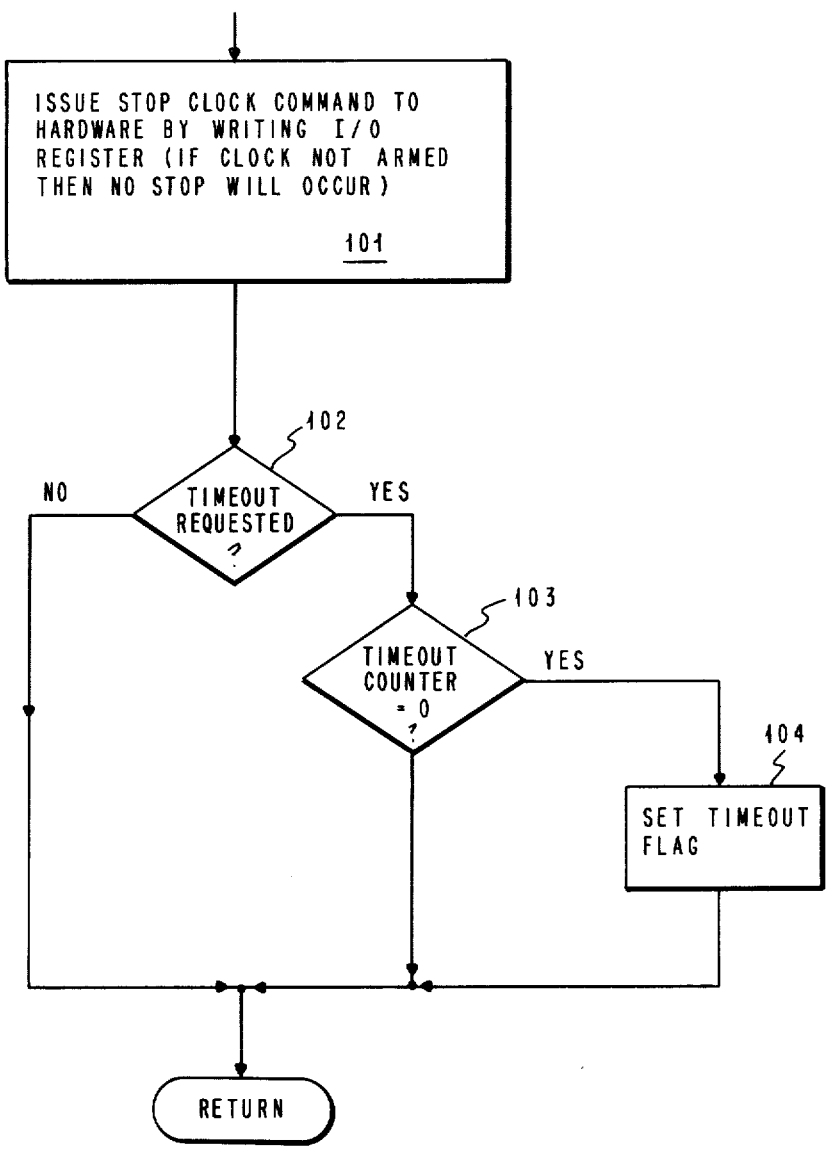
FIG. 6 is a flow chart of the operation of the system according to the present invention just prior to and just after the stopping of the system clock.

The flow chart of FIG. 4 depicts the comparison of an incoming data request with a predetermined event mask when the two are to be compared on a byte basis. In step 73, the sleep clock arm control of sleep control 32 is enabled. Recall that this is the first part in the two part process for stopping the system clock 33 to the non-continuously clocked devices in the system. Next, in step 74, the data to which the event occurrence data is to be compared on the byte basis is read from the specified location in either system RAM 15 or from the location in the specific I/O device that has been requested. In decision block 75, a determination is made as to whether the two pieces of data are to be compared for an equal or a not equal. If an equality is required, then this determination is made in decision block 77 as to whether or not the event data is equal to the predetermined data (mask). If an equality exists, than as shown in step 79, the predetermined event has occurred and a good return code is set and the operation is carried out by the system. However, if the answer to decision block 77 is no, then a second determination is made in decision block 81 as to whether or not a time-out flag has been set, i.e., has the wait time limit expired. If the answer is yes, then in step 82 a time-out return code is set and the program requesting the wait is notified. However, if time-out has not occurred, then as shown in step 83 the routine shown in FIG. 6 is executed which stops the clock and then checks for the time limit expiration after the clock is restarted by an external event (DMA or interrupt request). A similar operation takes place when the incoming data is compared with the predetermined mask to determine if they are not equal. This is done in decision block 76 and a no here indicates that the event, i.e., a not equal has occurred and a good return code is set and the program waiting for the event is notified of its occurrence. If the data in the mask are equal, which is not the sought after event, then the time-out flag is examined as was done previously.

Note that event occurrence data may be set by an I/O interrupt service routine or directly by an I/O device itself through an I/O read or direct memory access.

Figure 5:
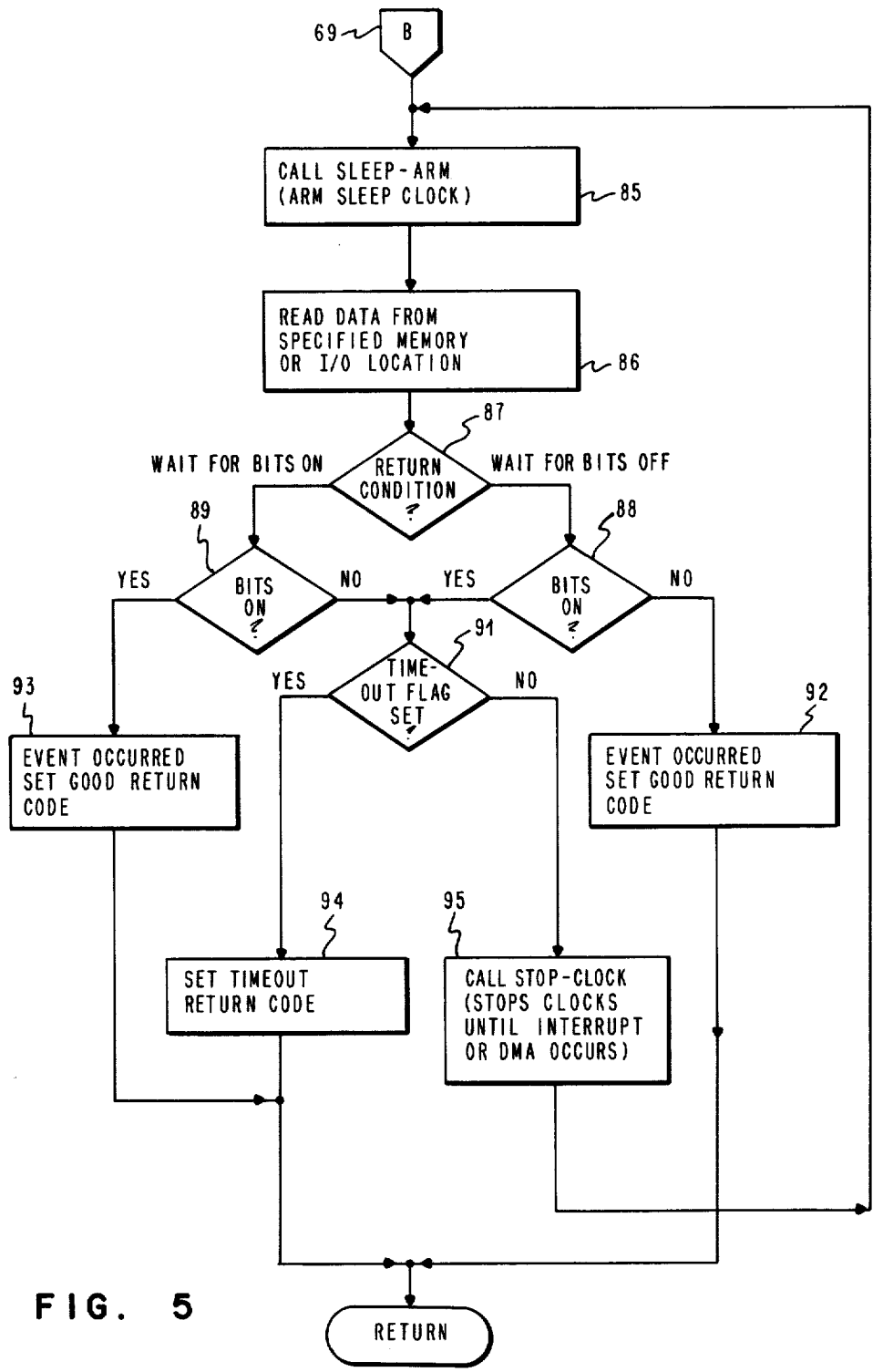
FIG. 5 is a flow chart depicting the testing of the bits of a predetermined event with the bits of a received event.

The flow chart of FIG. 5 explains the operation when the event occurrence data is compared on a bit by bit basis with the predetermined event which is being waited for. The operation of the flow chart of FIG. 5 is identical to the operation of the flow chart of FIG. 4 except that bits are being compared rather than an entire byte. Consequently, decision block 87 functions the same as decision block 75 except that the answers depend upon whether or not the bits being compared are equal or not equal. This is, if the bits being compared in decision block 87 are equal, then decision block 89 is reached. However, if the bits being compared in decision block 87 are not equal, then decision block 88 is reached. If an equality is required as is by decision block 89 and it is achieved, then step 93 performs the same function as step 79. Similarly, if an inequality is required and it is received, then step 92 performs the same function as step 78. The operation of decision block 91 as well as steps 94 and 95 is the same as decision block 81 and steps 82 and 83 respectively.

The process by which sleep clock control 32 halts the output of system clock 33 to the non-continuously clocked devices in the system is shown in the flow chart of FIG. 6. Step 101 indicates that a stop clock command is issued to the stop clock circuitry within stop clock control 32. Note that if the stop clock circuitry has not been previously armed, or has been disarmed by an event already occurring, then no stopping of the clocking signal from output 40 will occur. After the sleep clock 51 has been restarted, i.e., sleep clock 32 has once again begun outputting the clocking signal over output 40 to the clocked devices in the system by either a DMA request or by an interrupt request, then decision block 102 is reached. As can be seen, if a time-out has not been requested, then system operation returns to decision block 67 in FIG. 4 or 69 in FIG. 5. However, if a time-out has been requested, then a time-out counter is checked in decision block 103 as to whether or not it is equal to 0. If the time-out counter is not equal to 0, then once again system operation returns to decision block 67 or 69. However, if the time-out counter is equal to 0, then as shown in step 104 a time-out flag is first set. After the time-out flag has been set in step 104, then system operation returns once again to either decision block 67 or 69.

Figure 7:
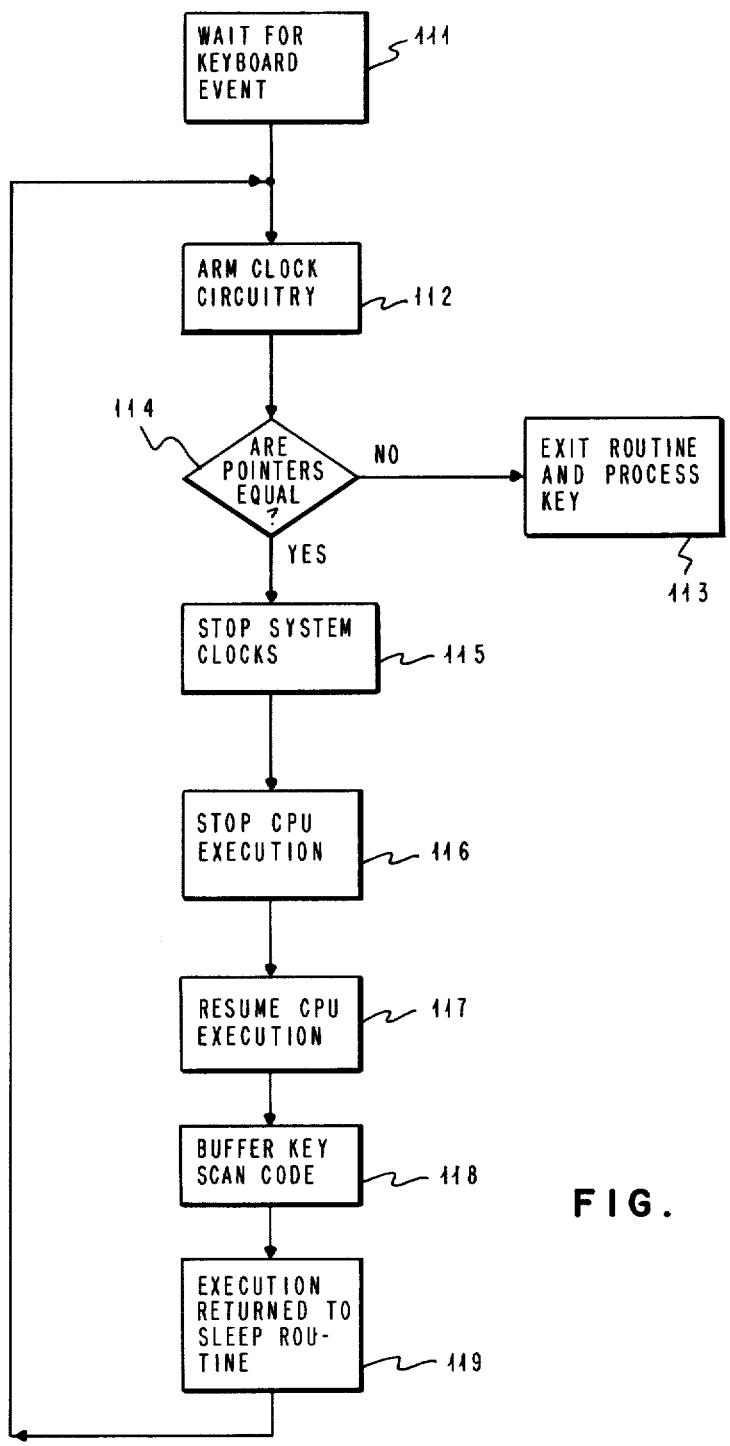
FIG. 7 is a flow chart of the operation of the system according to the present invention as it awaits a keyboard interrupt.
Figure 8:
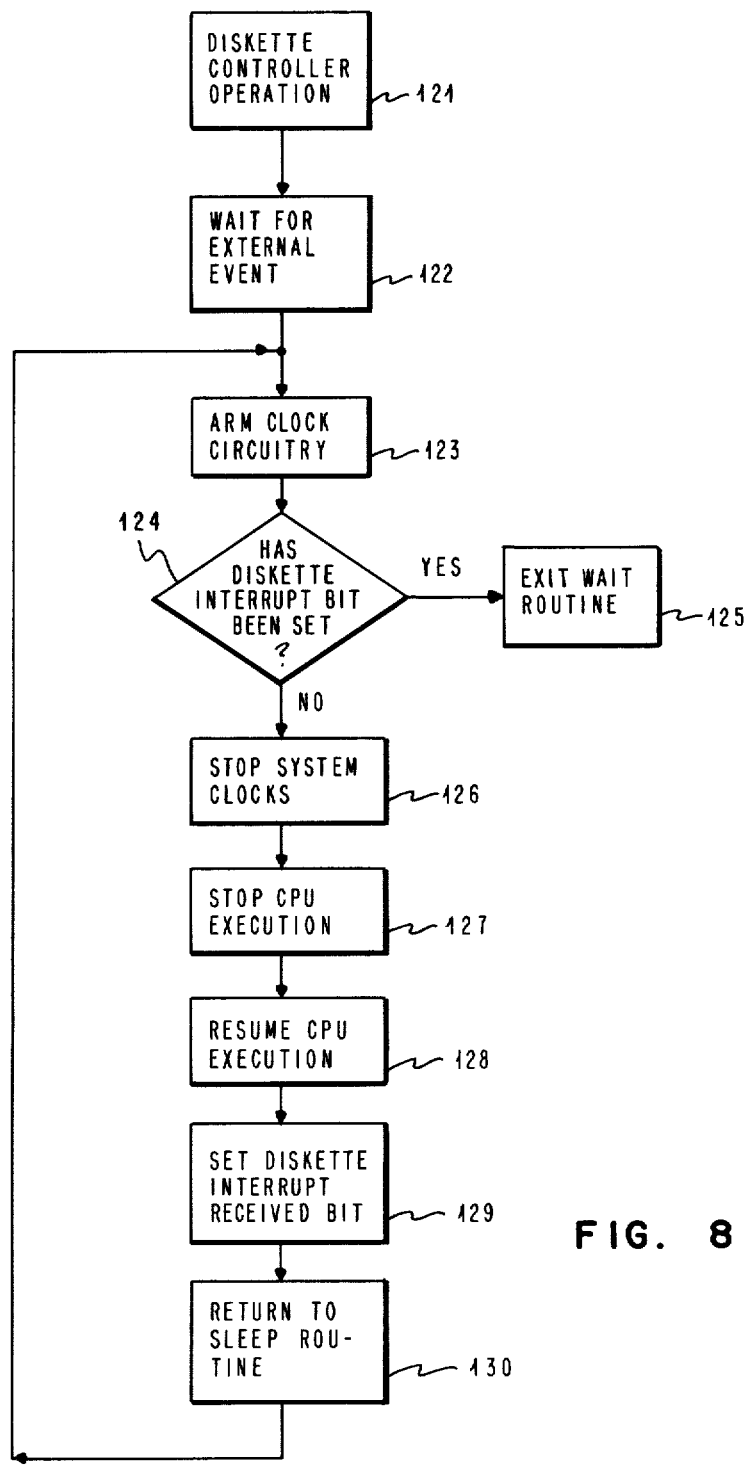
FIG. 8 is a flow chart of the system according to the present invention as it awaits a diskette interrupt.

The flow charts of FIG. 7 and FIG. 8 explain the operation of the system while a program running on CPU 11 is waiting for a keystroke to occur or for one of diskette drives 26 or 27 to be accessed, respectively. The flow chart of FIG. 7 details the operation of the system of the present invention as the program running on CPU 11 awaits keystroke from keyboard 28. In step 111, the running program invokes a wait-for-keyboard-event function by specifying that the program wait for a compare not equal. This is, the keyboard buffer start is not equal to the keyboard buffer end, thereby signifying that keyboard data has been received. This result describes a keyboard event. Additionally, no time limit is set for this keyboard event to occur. In step 112, the sleep clock control circuitry is armed but the system clock continues to be provided over output 40. In step 114, the start and end pointers of a keyboard buffer (not shown) are compared. If the start and end pointers are not equal, then this is an indication that the awaited for keyboard data has been received and there is no longer a need to wait for a further keyboard event. Subsequently, the keystroke which has been entered is processed. However, if the pointers are equal, then as shown in step 115, the system clock output over line 51 is halted by sleep clock control 32. Additionally, as shown in step 116, the execution by CPU 11 is stopped until either a direct memory access request or an interrupt request is presented to sleep clock control 32, which in turn resumes the outputting of the system clock over output 40 to bus 51. In step 117, CPU execution is resumed after the receipt of an interrupt, and in step 118, the scan code of the keystroke which was just received will be put into the keyboard buffer and the end pointer of the buffer will be incremented thereby making the start and end pointer of the buffer not equal. After the keystroke has been processed, step 119 indicates that execution is returned to the sleep routine, thereby rearming the sleep clock and determining that the keyboard event has occurred.

Similarly, the operation of an application program running on CPU 11 is detailed in the flow chart of FIG. 8 while the program is accessing either of diskette drives 26 or 27. In step 121, the executing program sends commands to diskette controller 19. When the last command has been sent to diskette controller 19, it begins performing the required operation on one of diskettes 26 or 27 independent of CPU 11. Diskette controller 19 will notify CPU 11 of the completion of the operation or if an error occurs using an interrupt request through interrupt controller 12. In step 122, the executing program invokes a "wait for external event" routine and specifies a return operation when a diskette interrupt received flag has been set. When using diskette controller 19, a time-out period is set to cause the wait to be aborted if the event being waited for has not occurred within that time-out period. In step 123, the stop clock control circuitry is armed, but the system clock continues to be provided over output 40 to the non-continuously clocked devices. In decision block 124, a determination is made as to whether or not a diskette interrupt bit has been set. If the bit has been set, then this is an indication that a diskette interrupt has been received by interrupt controller 12 and so the "wait on external event" routine is exited in order to check to see if the diskette operation has been completed.

However, if the diskette interrupt bit has not been set, then a signal is sent to sleep clock control 32 to stop outputting a clocking signal over output 40. The stopping of the clocking signal continues until either the next direct memory access request or until an interrupt request is received by CPU 11. Attendant with the stopping of the clocking, the execution of CPU 11 is stopped until either the DMA request or an interrupt request is received. When either of the above two events occurs, then the execution of CPU 11 is resumed as shown in step 128. In step 129, a determination is made as to whether or not either of diskette drives 26 or 27 were the device requesting the interrupt. If so, then an interrupt handler for one of diskette drives 26 or 27 will set the diskette interrupt received bit. Finally, in step 130 after the interrupt has been handled and processed, control is returned to the wait for external event routine to determine that the event has occurred. The wait routine is then exited.

While the invention has been particularly shown and described with reference to a preferred embodiment it will be understood by those skilled in the art that various other changes in form and detail may be made without departing from the spirit and scope of the invention.

I claim:

1. A method of controlling a clock signal in an information processing system, said system includes a memory, at least one I/O device, and a clock for providing a signal to a central processor unit, said method comprising the steps of:
  selectively establishing a desired event from a plurality of events to control the supply of said clock signal to said central processor unit;
  arming a control circuit which enables the supply of said clock signal to be stopped;
  determining subsequent to said arming step whether said desired event has occurred;
  stopping said supply of said clock signal to said central processor unit a first time in response to said arming step and said desired event has not occurred:
  disarming said control unit in response to the occurrence of an interrupt generated by an I/O device or a request for memory access;
  starting the supply of said clock signal to said central processor unit in response to said disarming step;
  rearming said control circuit; and
  stopping the supply of said clock signal to said central processor unit a second time if said interrupt or said request was not said desired event.

2. The method as recited in claim 1 wherein said step of establishing said desired event further includes a step of associating a pre-existing mask with said desired event.

3. The method as recited in claim 2 wherein said desired event may be one of a plurality of interrupts and a byte of data is associated with each one of the plurality of interrupts to identify each of the interrupts and wherein said step of determining whether said event has occurred includes the step of comparing said byte of data associated with the interrupt which occurred with said pre-existing mask associated with said desired event.

4. The method as recited in claim 1 wherein said step of establishing said desired event includes the step of associating a group of bits with said event.

5. The method as recited in claim 4 wherein said desired event may be one of a plurality of interrupts and said group of bits is associated with each one of the plurality of interrupts and wherein said step of determining whether said desired event has occurred includes the step of comparing selected ones of said group of bits associated with the interrupt which occurred with selected bits within said group of bits associated with said desired event.

6. The method as recited in claim 1 further includes the step of detecting whether said interrupt was generated by a system timer circuit.

7. The method as recited in claim 6 further includes the steps of:
  detecting in response to said step of starting said clock signal whether a predetermined time period has expired prior to the occurrence of said desired event; and
  generating an error signal subsequent to the expiration of said predetermined time period.

8. The method as recited in claim 1 wherein said step of stopping said supply of said clock signal said first time further includes the step of issuing a stop instruction to said central processor unit.

9. The method as recited in claim 8 further includes the step of determining whether said interrupt or said request was said desired event.

10. The method as recited in claim 8 wherein said stop instruction is a first stop instruction and wherein said step of stopping said supply of said clock signal said second time further includes the step of issuing a second stop instruction to said central processor unit.

* * * * *